US010086471B2

(12) United States Patent
Mabee

(10) Patent No.: US 10,086,471 B2
(45) Date of Patent: Oct. 2, 2018

(54) LASER ENCLOSURE WITH RECIPROCALLY MOVABLE SHUTTLE STRUCTURE, AND METHOD OF USING SAME

(71) Applicant: Lincoln Global, Inc., City of Industry, CA (US)

(72) Inventor: Brian Mabee, Shelby Township, MI (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 688 days.

(21) Appl. No.: 14/666,569

(22) Filed: Mar. 24, 2015

(65) Prior Publication Data

US 2015/0273625 A1    Oct. 1, 2015

Related U.S. Application Data

(60) Provisional application No. 61/972,552, filed on Mar. 31, 2014.

(51) Int. Cl.
*B23K 26/02* (2014.01)
*B23K 26/12* (2014.01)
(Continued)

(52) U.S. Cl.
CPC .......... *B23K 26/083* (2013.01); *B23K 26/127* (2013.01); *B23K 26/706* (2015.10);
(Continued)

(58) Field of Classification Search
CPC .. B23K 26/706; B23K 26/083; B23K 26/127; B23K 26/0838; B23K 26/0853;
(Continued)

(56) References Cited

U.S. PATENT DOCUMENTS

| 4,205,216 A | 5/1980 | Douglas |
| 5,132,510 A | 7/1992 | Klingel |

(Continued)

FOREIGN PATENT DOCUMENTS

| CN | 101633079 A | 1/2010 |
| CN | 102218601 A | 10/2011 |

(Continued)

OTHER PUBLICATIONS

Japanese to English machine translation of JP 2003340589.*

(Continued)

*Primary Examiner* — Michael G Hoang
(74) *Attorney, Agent, or Firm* — Brad C. Spencer

(57) ABSTRACT

A laser processing unit includes a workpiece loading station. A laser workstation includes a laser robot operable to perform a laser operation on a workpiece. A track extends from the loading station through the workstation. A first stationary wall section separates the workstation from the loading station at a proximal side of the workstation. A second stationary wall section is offset from the first stationary wall section at a distal side. A first movable wall section forms a laser light-tight seal with the first stationary wall section. A second movable wall section forms a laser light-tight seal with the second stationary wall section. A shuttle is operable to move along the track to deliver the workpiece from the loading station to the workstation. The movable wall sections are supported by the shuttle and move concurrently with the shuttle and the workpiece, as the workpiece is delivered to the workstation.

14 Claims, 13 Drawing Sheets

(51) Int. Cl.
   *B23K 26/00* (2014.01)
   *B23K 26/08* (2014.01)
   *B23K 37/00* (2006.01)
   *B23K 37/047* (2006.01)
   *B23K 26/70* (2014.01)
   *B23K 101/00* (2006.01)

(52) U.S. Cl.
   CPC .......... *B23K 37/006* (2013.01); *B23K 37/047* (2013.01); *B23K 2201/006* (2013.01)

(58) Field of Classification Search
   CPC ............ B23K 37/006; B23K 2201/006; B23K 37/047; B23K 26/02; B23K 26/12; B23K 26/00
   USPC ............................ 219/121.6, 121.63–121.64, 219/121.85–121.86, 158–159, 121.82
   See application file for complete search history.

(56) References Cited

U.S. PATENT DOCUMENTS

| | | | |
|---|---|---|---|
| 5,464,963 A | 11/1995 | Hostler | |
| 5,643,477 A | 7/1997 | Gullo | |
| 7,132,622 B2 | 11/2006 | Ito | |
| 8,084,714 B2 | 12/2011 | Brauchle | |
| 2002/0002418 A1* | 1/2002 | Pratt | B23K 26/0861 700/166 |
| 2009/0233536 A1 | 9/2009 | Crees | |
| 2012/0160816 A1 | 6/2012 | Hubert | |

FOREIGN PATENT DOCUMENTS

| | | |
|---|---|---|
| CN | 203751534 U | 8/2014 |
| EP | 0 464 455 B1 | 1/1992 |
| EP | 0 511 508 A1 | 11/1992 |
| JP | 03-94990 A | 4/1991 |
| JP | 04-169419 A | 6/1992 |
| JP | 2003-340589 A | 12/2003 |
| TW | 316437 | 11/2009 |

OTHER PUBLICATIONS

International Search Report for PCT/IB2015/000405 dated Aug. 20, 2015.
Written Opinion for PCT/IB2015/000405 dated Aug. 20, 2015.
International Preliminary Report on Patentability for PCT/IB2015/000405 dated Oct. 4, 2016.

* cited by examiner

LASER ENCLOSURE WITH RECIPROCALLY MOVABLE SHUTTLE STRUCTURE, AND METHOD OF USING SAME

CROSS-REFERENCE TO RELATED APPLICATIONS

Benefit of U.S. Provisional Patent Application Ser. No. 61/972,552 filed Mar. 31, 2014, is hereby claimed and the disclosure incorporated herein by reference.

BACKGROUND OF THE INVENTION

Field of the Invention

The present invention relates generally to laser enclosures, and more particularly to a laser enclosure with one or more movable wall sections for allowing efficient material transfer and improved processing efficiency. The present invention also relates to a method of processing workpieces in such a laser enclosure.

Description of the Background Art

Laser processing can include but is not limited to, cutting welding, heat treating, material removal and material deposition of various ferrous and non-ferrous materials, substrates, coatings and additive substances. In manufacturing and other environments where it is necessary to optimize cycle time for piece part production, the ability to move parts into and out of a work cell is critical to the success of the part manufacturer.

Typical designs and methods for creating access to the inside of a class I laser enclosure are through the use of moving doors. Doors open and close, which allow persons, transfer tables or shuttles to move material into and out of fixtures, which hold workpieces for laser processing. Door movement and material transfer are independent sequential operations. i.e., the workpiece cannot be moved into or out of the enclosure until the door opens, and the laser cannot begin processing until the door is closed and safety switch contacts are made.

Traditionally, laser enclosures contain pneumatically actuated doors to provide laser light tight sealing during the workpiece load and unload process. The typical time required to open a laser door is approximately 3 seconds. The typical time to move a new part into the cell is approximately 3 seconds and the typical time required to close a laser door is approximately 3 seconds. If the laser processing time is approximately 30 seconds, the laser "on" time in a conventional system is $30/(3+3+3+30)=76.9\%$.

SUMMARY OF THE INVENTION

For the purpose of solving the above-mentioned problems, the present invention according to a first aspect thereof provides a laser processing unit for processing workpieces. The laser processing unit includes at least one transfer station for temporarily holding workpieces and a laser workstation which defines a space for performing laser operations on the workpieces. The laser workstation has at least one stationary wall section, the at least one stationary wall section being disposed between the laser workstation and the at least one transfer station.

The laser processing unit according to the first aspect of the invention further includes at least one movable wall section. The at least one movable wall section is operable to form a laser light-tight seal with the at least one stationary wall during laser operations. The laser processing unit also includes a transfer robot for transferring workpieces between the workstation and the at least one transfer station.

Further according to the first aspect of the invention during a laser operation period, the at least one moveable wall section forms a laser light-tight seal with the first stationary wall section to define at least one wall of the laser workstation. The at least one wall permits the at least one laser robot to perform laser operations on a workpiece located within the laser workstation while preventing laser light leakage from the laser workstation.

In the proposed configuration the time required to provide laser light-tight sealing happens concurrently with the transferring of the workpiece into and out of the workstation. By eliminating the pneumatically actuated doors, the laser "on" time will be $30/(3+30)=90.9\%$. This should result in a 14% increase in production.

In addition, during a workpiece transfer operation, the at least one moveable wall section moves horizontally concurrently with the transfer robot.

According to a second aspect of the invention, in addition to the first aspect, the laser processing unit is characterized in that the at least one stationary wall section includes a seal-forming edge, the at least one movable wall section includes a seal forming edge, and the seal-forming edge on the at least one movable wall section is operable to form the laser light-tight seal with the seal-forming edge on the stationary wall section.

According to a third aspect of the invention, in addition to the first aspect, the laser processing unit also includes a pair of rails and a shuttle that is operable to move along the rails. The laser processing unit according to the third aspect is characterized in that the at least one transfer station includes a loading station and an unloading station, the at least one stationary wall section includes a first stationary wall section between the workstation and the loading station and a second stationary wall section between the workstation and the unloading station. In addition, the at least one movable wall includes a first movable wall section supported on the shuttle and being operable to form a laser light-tight seal with the first stationary wall and a second movable wall section supported on the shuttle and being operable to form a laser light-tight seal with the second stationary wall.

The third aspect of the invention is further characterized in that during a workpiece transfer operation each of the first and second movable wall sections moves horizontally concurrently with the transfer robot According to a fourth aspect of the invention in addition to the third aspect, the laser processing unit is characterized in that during a laser operation period: the first movable wall section forms a laser light-tight seal with the first stationary wall section to define a first side wall of the laser workstation and the second movable wall section forms a laser light-tight seal with the second stationary wall section to define a second side wall of the laser workstation. The formed first and second side walls permit the least one laser robot to perform laser operations on a workpiece located within the laser workstation while preventing laser light leakage from the laser workstation.

The fourth aspect of the invention is further characterized in that during a workpiece transfer operation: the first movable wall section is moved by the shuttle horizontally along the rails in a first direction away from the loading station across the laser workstation to allow loading of the laser workstation and the second movable wall is moved by the shuttle horizontally along the rails in the first direction away from the laser workstation across the unloading station to allow unloading of the laser workstation. The transfer robot transfers a workpiece from the loading station over the first stationary wall section to the laser workstation, and also transfers a finished workpiece from the laser workstation over the second stationary wall section to the unloading station. After completing the transfer of the workpieces, the first and second movable wall sections are moved together by the shuttle in a second direction, opposite the first direction, to return to their initial position.

According to a fifth aspect of the invention, in addition to the first aspect, the laser processing unit further comprises a pair of rails and a shuttle operable to move along the rail. The laser processing unit is characterized in that the at least one transfer station includes a first transfer station and a second transfer station. Also the at least one stationary wall section includes a first stationary wall section between the workstation and the first transfer station, and a second stationary wall section between the workstation and the second transfer station. The at least one movable wall section includes a first movable wall section supported on the shuttle and being operable and to form a laser light-tight seal with the first stationary wall in a second shuttle position, a second movable wall station supported on the shuttle and being operable to form a laser light-tight seal with the first stationary wall section in a first shuttle position and to form a laser light-tight seal with the second stationary wall section in the second shuttle position, and a third movable wall section supported on the shuttle operable to form a laser light-tight seal with the second stationary wall section in the first shuttle position.

The fifth aspect is further characterized in that during a workpiece transfer operation, each of the first, second and third movable wall sections is moved by the shuttle horizontally along the tracks, such movement being concurrent with the transport of workpieces.

According to a sixth aspect of the invention, in addition to the fifth aspect, the laser processing unit is further characterized in that a laser operation can be performed during a first laser operation period when the shuttle is in the first shuttle position and during a second laser operation period when the shuttle is in the second shuttle position.

According to the sixth aspect, during the first laser operation period the second movable wall section forms a laser light-tight seal with the first stationary wall section to define a first end wall of the laser workstation and the third movable wall section forms a laser light-tight seal with the second stationary wall section to define a second end wall of the laser workstation. This permits the least one laser robot to perform laser operations on one of said workpiece located within the laser workstation while preventing laser light leakage from the laser workstation.

Similarly, during the second laser operation period the first movable wall section forms a laser light-tight seal with the first stationary wall section to define a first end wall of the laser workstation and the second movable wall section forms a laser light-tight seal with the second stationary wall section to define a second end wall of the laser workstation. This also permits the least one laser robot to perform laser operations on one of said workpieces located within die workstation while preventing laser light leakage from the laser workstation in the second laser operation period.

The sixth aspect is additionally characterized in that during a first workpiece transfer operation the shuttle moves from the first shuttle position to the second shuttle position, the first movable wall section is moved horizontally along the rails by the shuttle in a first direction across the first transfer station away from the laser workstation in order to allow unloading of a finished workpiece into the first transfer station, the second movable wall is moved horizontally along the rails by the shuttle in the first direction away from the second stationary wall section of the laser workstation across to the workstation to the first stationary wall section of the laser workstation in order to allow loading of an unfinished workpiece into the workstation and the third movable wall section is moved horizontally along the rails by the shuttle in the first direction toward the laser workstation.

In accordance with a further aspect of the invention, provided is a laser processing unit. The laser processing unit includes a workpiece loading station, and a laser workstation including a laser robot operable to perform a laser operation on a workpiece. A track extends from the workpiece loading station through the laser workstation. A first stationary wall section separates the laser workstation from the workpiece loading station at a proximal side of the laser workstation. A second stationary wall section is offset from the first stationary wall section at a distal side of the laser workstation opposite the proximal side. A first movable wall section is configured to form a laser light-tight seal with the first stationary wall section. A second movable wall section is configured to form a laser light-tight seal with the second stationary wall section. A shuttle is operable to move along the track to deliver the workpiece from the workpiece loading station to the laser workstation, wherein the first movable wall section and the second movable wall section are supported by the shuttle and move concurrently with the shuttle and the workpiece as the workpiece is delivered to the laser workstation.

In certain embodiments, the laser processing unit further comprises an enclosure surrounding the laser workstation. The enclosure includes a first end wall section located at the proximal side of the laser workstation and a second end wall section located at the distal side of the laser workstation. The first stationary wall section and the first movable wall section together form at least a portion of the first end wall section of the enclosure surrounding the laser workstation. The second stationary wall section and the second movable wall section together form at least a portion of the second end wall section of the enclosure surrounding the workstation. During a workpiece transfer operation performed by the laser processing unit, the first movable wall section is moved by the shuttle along the track to form an opening in the first end wall section, and concurrently the workpiece is moved by the shuttle from the workpiece loading station into the laser workstation through the opening in the first end wall section, and the second movable wall section is moved by the shuttle along the track to form an opening in the second end wall section, and concurrently another workpiece is removed by the shuttle from the laser workstation through the opening in the second end wall section.

In further embodiments, the track is a first track, and the laser processing unit further comprises a second track, extending from the workpiece loading station through the laser workstation, upon which the shuttle is operable to move, wherein the first stationary wall section and the second stationary wall section are located between the first track and the second track. The laser processing unit includes a workpiece unloading station, wherein the workpiece unloading station is separated from the laser workstation by the second stationary wall section. A transfer robot is supported on the shuttle for carrying the workpiece from the loading station into the laser workstation during the workpiece transfer operation and concurrently carrying the another workpiece from the laser workstation into the workpiece unloading station during the workpiece transfer operation.

In further embodiments, the transfer robot comprises a plurality of handling arms configured to raise the workpiece over the first stationary wall section during the workpiece transfer operation and raise the another workpiece over the second stationary wall section during the workpiece transfer operation.

In further embodiments, one of the first movable wall section and the second movable wall section moves within the laser workstation during the workpiece transfer operation.

In certain embodiments the workpiece loading station is a first workpiece loading station, and the laser processing unit further comprises a second workpiece loading station, wherein the second workpiece loading station is separated from the laser workstation by the second stationary wall section, and the second movable wall section is configured for movement across the laser workstation by the shuttle during a workpiece transfer operation performed by the laser processing unit, and to form a laser light-tight seal with the second stationary wall section in a first shuttle position and form the laser light-tight seal with the first stationary wall section in a second shuttle position.

In further embodiments, a third movable wall section is supported by the shuttle for concurrent movement with the first movable wall section and the second movable wall section. The third movable wall section is configured to form a laser light-tight seal with the second stationary wall section in the second shuttle position, and wherein during the workpiece transfer operation, while the second movable wall section moves across the laser workstation, the first movable wall section moves across the first workpiece loading station and the third movable wall section moves across the second workpiece loading station.

In certain embodiments, an enclosure surrounds the laser workstation. The enclosure comprises a first end wall section located at the proximal side of the laser workstation and a second end wall section located at the distal side of the laser workstation. The first stationary wall section and the first movable wall section together form at least a portion of the first end wall section of the enclosure surrounding the laser workstation, and the first stationary wall section and the first movable wall section include corresponding seal forming edges that form the laser light-tight seal between the first stationary wall section and the first movable wall section. The second stationary wall section and the second movable wall section together form at least a portion of the second end wall section of the enclosure surrounding the laser workstation, and the second stationary wall section and the second movable wall section include corresponding seal forming edges that form the laser light-tight seal between the second stationary wall section and the second movable wall section.

In accordance with a still further aspect of the invention, provided is a laser processing unit. The laser processing unit includes a workpiece loading station and a workpiece unloading station. A laser workstation is located between the workpiece loading station and the workpiece unloading station, and includes a laser robot operable to perform a laser operation on a workpiece. A track extends from the workpiece loading station through the laser workstation to the workpiece unloading station. A first stationary wall section separates the laser workstation from the workpiece loading station. A second stationary wall section is offset from the first stationary wall section and separates the laser workstation from the workpiece unloading station. A first movable wall section is configured to form a laser light-tight seal with the first stationary wall section. A second movable wall section is configured to form a laser light-tight seal with the second stationary wall section. A shuttle is operable to move along the track to deliver the workpiece from the workpiece loading station to the laser workstation, wherein the first movable wall section and the second movable wall section are supported by the shuttle and move concurrently with the shuttle and the workpiece as the workpiece is delivered to the laser workstation.

In certain embodiments, the laser processing unit further includes an enclosure surrounding the laser workstation. The enclosure comprises a first end wall section separating the laser workstation from the workpiece loading station, and a second end wall separating the laser workstation from the workpiece unloading station. The first stationary wall section and the first movable wall section together form at least a portion of the first end wall section of the enclosure surrounding the laser workstation, and the second stationary wall section and the second movable wall section together form at least a portion of the second end wall section of the enclosure surrounding the workstation. During a workpiece transfer operation performed by the laser processing unit, the first movable wall section is moved by the shuttle along the track and across the laser workstation to form an opening in the first end wall section, and concurrently the workpiece is moved by the shuttle from the workpiece loading station into the laser workstation through the opening in the first end wall section, and the second movable wall section is moved by the shuttle along the track and across the workpiece unloading station to form an opening in the second end wall section, and concurrently another workpiece is removed by the shuttle from the laser workstation through the opening in the second end wall section.

In certain embodiments the track is a first track and the workpiece is a first workpiece, and the laser processing unit further comprises a second track, extending from the workpiece loading station through the laser workstation, upon which the shuttle is operable to move, wherein the first stationary wall section and the second stationary wall section are located between the first track and the second track. A transfer robot is supported on the shuttle for carrying the first workpiece from the loading station into the laser workstation during a workpiece transfer operation performed by the laser processing unit, and concurrently carrying a second workpiece from the laser workstation into the workpiece unloading station during the workpiece transfer operation. During the workpiece transfer operation, the first movable wall section is moved by the shuttle along the track and across the laser workstation to form an opening in the first end wall section, and concurrently the first workpiece is moved by the shuttle from the workpiece loading station into the laser workstation through the opening in the first end wall section, and the second movable wall section is moved by the shuttle along the track and across the workpiece unloading station to form an opening in the second end wall section, and concurrently the second workpiece is removed by the shuttle from the laser workstation through the opening in the second end wall section.

In further embodiments, the first movable wall section and the second movable wall section are substantially C-shaped, and the opening formed in the first end wall section and the opening formed in the second end wall section are substantially C-shaped. In further embodiments, the transfer robot comprises a first pair of handling arms configured to raise the first workpiece over the first stationary wall section during the workpiece transfer operation, and a second pair of handling arms configured to raise the second workpiece over the second stationary wall section during the workpiece transfer operation. In still further embodiments, during the workpiece transfer operation, the first pair of handling arms are moved by the shuttle through the opening in the first end wall section, and the second pair of handling arms are moved by the shuttle through the opening in the second wall section.

In accordance with a still further aspect of the invention, provided is a laser processing unit. The laser processing unit includes a first workpiece transfer station, a second workpiece transfer station, and a laser workstation located between the first workpiece transfer station and the second workpiece transfer station. The laser workstation includes a laser robot operable to perform a laser operation on a workpiece. A track extends from the first workpiece transfer station through the laser workstation to the second workpiece transfer station. A first stationary wall section separates the laser workstation from the first workpiece transfer station. A second stationary wall section is offset from the first stationary wall section and separates the laser workstation from the second workpiece transfer station. A first movable wall section is configured to form a laser light-tight seal with the first stationary wall section. A second movable wall section is configured to form a laser light-tight seal with both of the first stationary wall section and the second stationary wall section. A third movable wall section configured to form a laser light-tight seal with the second stationary wall section. A shuttle is operable to move along the track to deliver the workpiece from either the first workpiece transfer station or the second workpiece transfer station to the laser workstation, wherein the first movable wall section, the second movable wall section, and the third movable wall section are supported by the shuttle and move concurrently with the shuttle and the workpiece as the workpiece is delivered to the laser workstation.

In certain embodiments, the second movable wall section is configured for movement across the laser workstation by the shuttle during a workpiece transfer operation performed by the laser processing unit, and to form the laser light-tight seal with the second stationary wall section in a first shuttle position and form the laser light-tight seal with the first stationary wall section in a second shuttle position.

In further embodiments, during the workpiece transfer operation, while the second movable wall section moves across the laser workstation, the first movable wall section moves across the first workpiece transfer station and the third movable wall section moves across the second workpiece transfer station. In still further embodiments, in the first shuttle position, the first movable wall section forms the laser light-tight seal with the first stationary wall section, and in the second shuttle position, the third movable was section forms the laser light-tight seal with the second stationary wall section. In still further embodiments, the stationary wall sections and the movable wall sections include corresponding seal forming edges that form the laser light-tight seals.

In certain embodiments, the laser processing unit includes a first tool tray disposed on the shuttle and movable between the first workpiece transfer station and the laser workstation, and a second tool tray disposed on the shuttle and movable between the second workpiece transfer station and the laser workstation.

For a more complete understanding of the present invention the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

A number of illustrative embodiments of the present invention will now be described in connection with the drawings. It should be understood that only structures and methodology needed for illustrating selected embodiments of the present invention are described herein. Other conventional structures, and those of ancillary and auxiliary components of the system, will be known and understood by those skilled in the art.

First Embodiment

Figure 1:
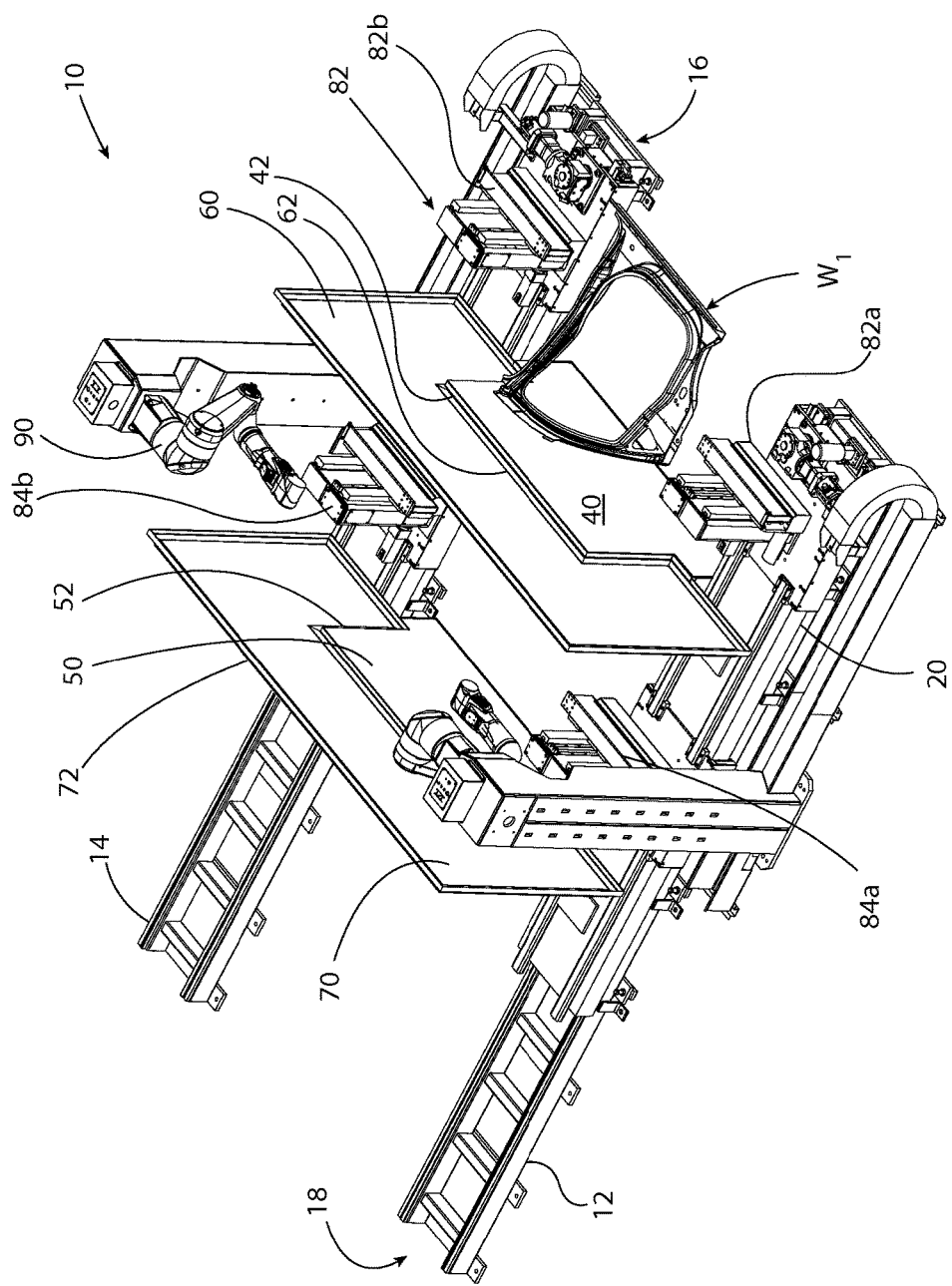
FIG. 1 is a perspective view of a laser enclosure and workpiece transfer apparatus according to a first embodiment of the invention.
Figure 2:
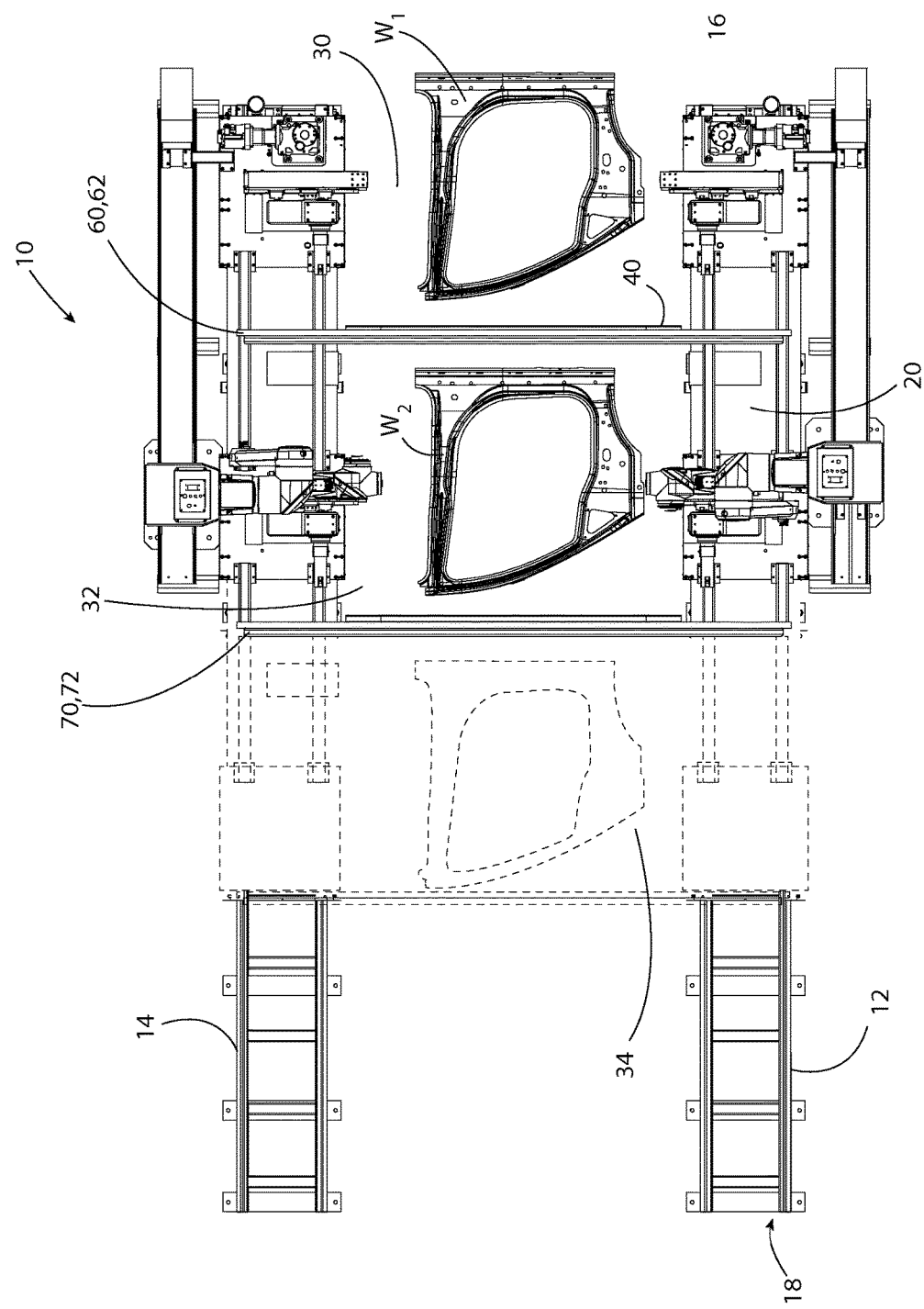
FIG. 2 is a top plan view of the apparatus of FIG. 1.
Figure 3:
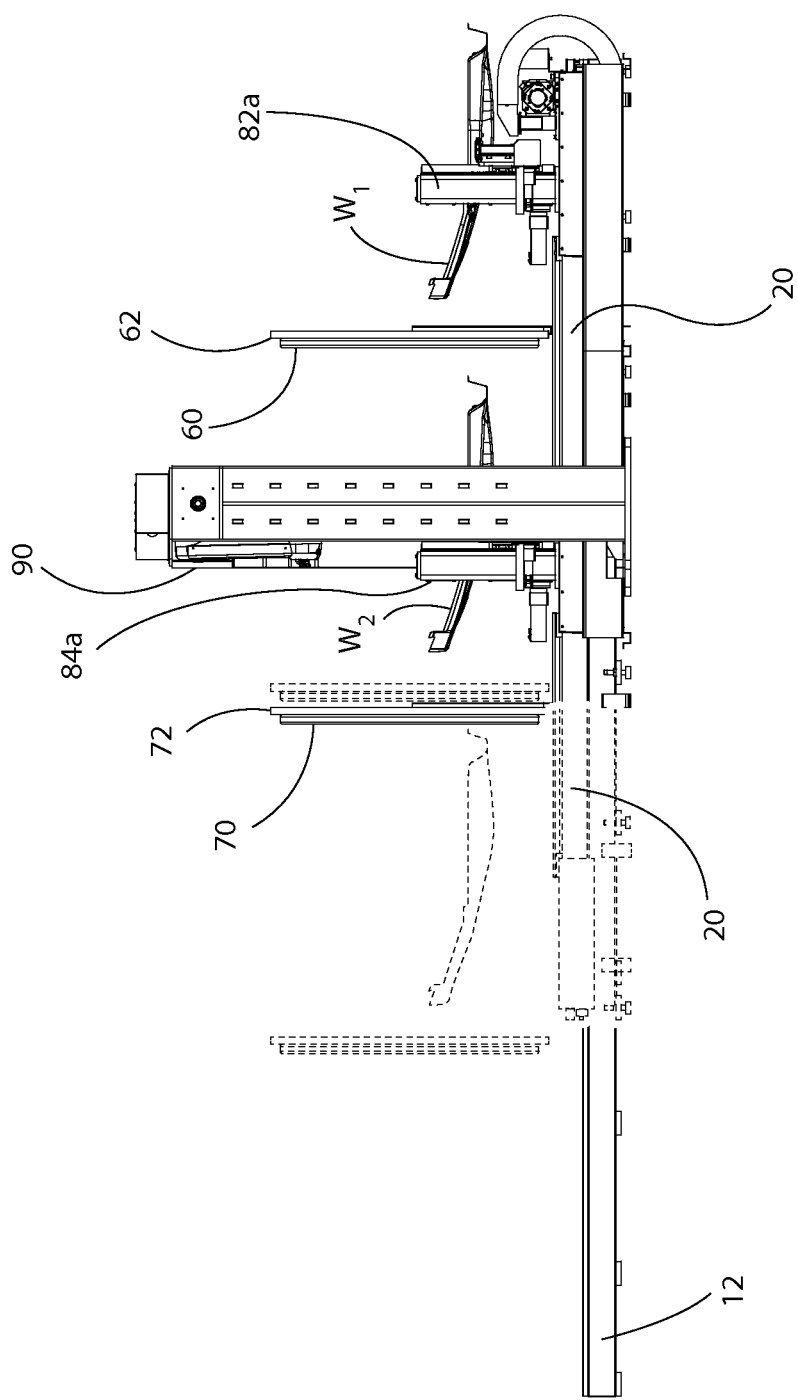
FIG. 3 is a side plan view of the apparatus of FIGS. 1-2.

As shown in FIGS. 1-3, a first embodiment of a laser processing unit 10 includes a pair of tracks 12, 14, running substantially parallel to each other, and disposed at opposite sides of the laser-processing unit 10. The tracks have a first (proximal) end 16 and a second (distal) end 18. A shuttle assembly 20 is movably attached to the tracks and is operable to move selectively and reciprocally along the tracks in either direction between the two ends 16, 18.

The shuttle assembly 20 has an actuator 204 (shown schematically in FIG. 6) operable to move the shuttle along the tracks. The actuator may, for example, include a motor and rack and pinion system.

As shown in FIG. 2, a loading station 30, a laser workstation 32 and an unloading station 34 are arranged in fixed positions along the tracks from the first track end 16 to the second track end 18, respectively.

A first stationary wall section 40 is disposed between the loading station 30, and the workstation 32. The first stationary wall section 40 is substantially vertical and extends between the tracks 12, 14. The first stationary wall section 40 comprises a sealing portion 42 which extends around a periphery of top, upper left side and upper right side edges thereof, and which is configured to create a light-tight seal when it comes into close abutting proximity with a corresponding edge portion of a movable wall section 60, as will be described in further detail herein.

A second stationary wall section 50 is spaced away from the first stationary wall section 40, and is disposed between the unloading station 34 and the workstation 32. The second stationary wall section 50 is substantially vertical and extends between the tracks 12, 14. The second stationary wall section 50 comprises a sealing portion 52 which extends around a periphery of a top edge, an upper left side edge and upper right side edge of the second stationary wall section 50.

A substantially permanent "brick-and-mortar" or other known permanent type of enclosure 500 (shown in FIG. 5) surrounds the workstation 32, and includes a roof 502, first and second outer end wall sections 504, 506, and opposed side wall sections (not shown).

The first and second end wall sections 504, 506 of the enclosure, respectively, form first and second openings, each opening substantially rectangular in shape, with one side open towards the bottom of the laser processing unit 10. Each of the first and second openings is defined by an upper enclosure edge, and left and right enclosure edges. The upper enclosure edge, and left and right enclosure edges, each includes a sealing portion, similar in structure (described below) to the sealing portion 42 of the first stationary wall section 40.

A first movable wall section 60 is fixably attached to the shuttle 20 for concurrent movement therewith. The first movable wall section 60 is substantially vertical. C-shaped and oriented with the opening facing downwardly as shown, and comprises a sealing portion 62. The shape of the movable wall section 60 is such that the dimensions of the internal edges defining the open portion C-shape correspond with the dimensions of the top edge, upper left side edge and upper right side edge of the first stationary wall section 40. In similar fashion, the outer side edges and top edge of the movable wall section have a similar sealing portion thereon for selectively and sealably aligning with inner edge portions (not shown) of the opening formed in an end wall portion of the enclosure.

As shown in FIG. 1, in a first position, the first movable wall section 60 is disposed proximate the stationary wall portion 40, such that a laser light-tight seal is formed between the sealing portion 42 of the first stationary wall portion 40, and the sealing portion 62 of the first movable wall portion 60. In this manner, the first stationary wall section 40 and the first movable wall section 60 form a first laser light-tight seal.

Similarly, when in the first position, the sealing portion 62 of the first movable wall section 60 forms a laser light-tight seal with a corresponding edge seal of the first end wall portion of the enclosure. In this manner, the first stationary wall portion 40, first movable wall portion 60, and first end wall portion together form a laser light-tight seal on a first end of the laser processing unit 10.

A second movable wall section 70 is fixably attached to the shuttle 20. The second movable wall section is substantially vertical, C-shaped and oriented with the opening facing downwardly, and comprises a sealing portion 72 in a manner similar to that described above in connection with the first movable wall section 60. As shown in FIG. 1, in a first position, the second movable wall section 70 is disposed proximate the second stationary wall portion 50, such that a laser light-tight seal is formed between the sealing portion 52 of the second stationary wall portion 50 and the sealing portion 72 of the second movable wall portion 70. In this manner the second stationary wall section 50 and the second movable wall section 70 form a second laser light-tight seal.

As described above regarding the first end of the laser processing unit 10, when in the first position, the sealing portion 72 of the second movable wall section 70 also forms a seal with the sealing portion of the second end wall of the enclosure such that the second stationary wall portion 50, the second movable wall section 70 and the second end wall portion together form a laser light-tight seal on a second end of the laser processing unit 10.

The apparatus 10 further includes a transfer robot 80 (FIG. 6) having a first pair of handling arms 82a, 82b and a second pair of handling arms 84a, 84b. The first pair of handling arms, 82a. 82b are operable to transfer workpieces $W_1$ from the loading station 30 over the first stationary wall 40 to the workstation 32. The second pair of handling arms 84a, 84b are operable to transfer workpieces $W_2$ from the workstation 32 to the unloading station 34.

Each of the handling arms 82a, 82b, 84a, and 84b includes a separate mechanism for selectively moving toward or away from a central plane disposed between the rails, moving up or down, and moving horizontally along the rails.

A laser robot 90 is operable to perform laser operations such as cutting, welding and/or heating on a workpiece while the workpiece is contained in the workstation 32.

Figure 4:
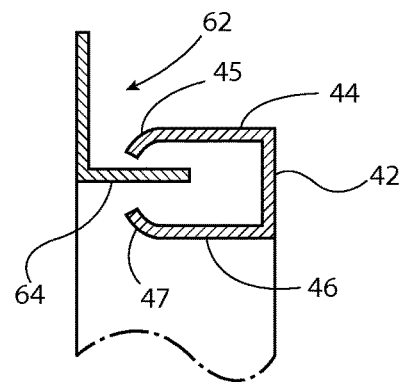
FIG. 4 is a detail view of a laser light-tight sealing system, which is a component of the apparatus of FIGS. 1-3.

FIG. 4 illustrates the formation of a laser light-tight seal by the operation of the sealing portion 42 of the stationary wall section 40 and sealing portion 62 of the movable stationary wall section 60.

Sealing portion 42 is U-shaped, having first and second outward extending portions 44, 46. The outward extending portions 44, 46 extend in a perpendicular direction from the stationary wall section 40, along an axis of the tracks 12, 14, and towards the workstation 32. Each of the first and second outward extending portions 44, 46 has a hook portion 45, 47 formed on an end furthest from the stationary wall section 40.

Sealing portion 62 is L-shaped, and has a single outward extending portion 64. The single outward extending portion 64 extends in a perpendicular direction from the movable wall section 60, along an axis of the tracks 12, 14, and towards the loading station 30. The single outward extending portion 64 is arranged on the movable wall section 60 such that when the movable wall is moved in the first position, as discussed above, the single outward extending portion 64 extends between the first and second outward extending portions 44, 46 of the sealing portion 42. This creates a laser light-tight seal that is eye safe according to ANSI Standard Z136.X.

Those in the relevant art will understand that many alternate laser light sealing structures are known and could alternatively be used. One such alternate light-sealing structure is that disclosed in U.S. Pat. No. 5,643,477, the entire disclosure of which is incorporated by reference.

Figure 6:
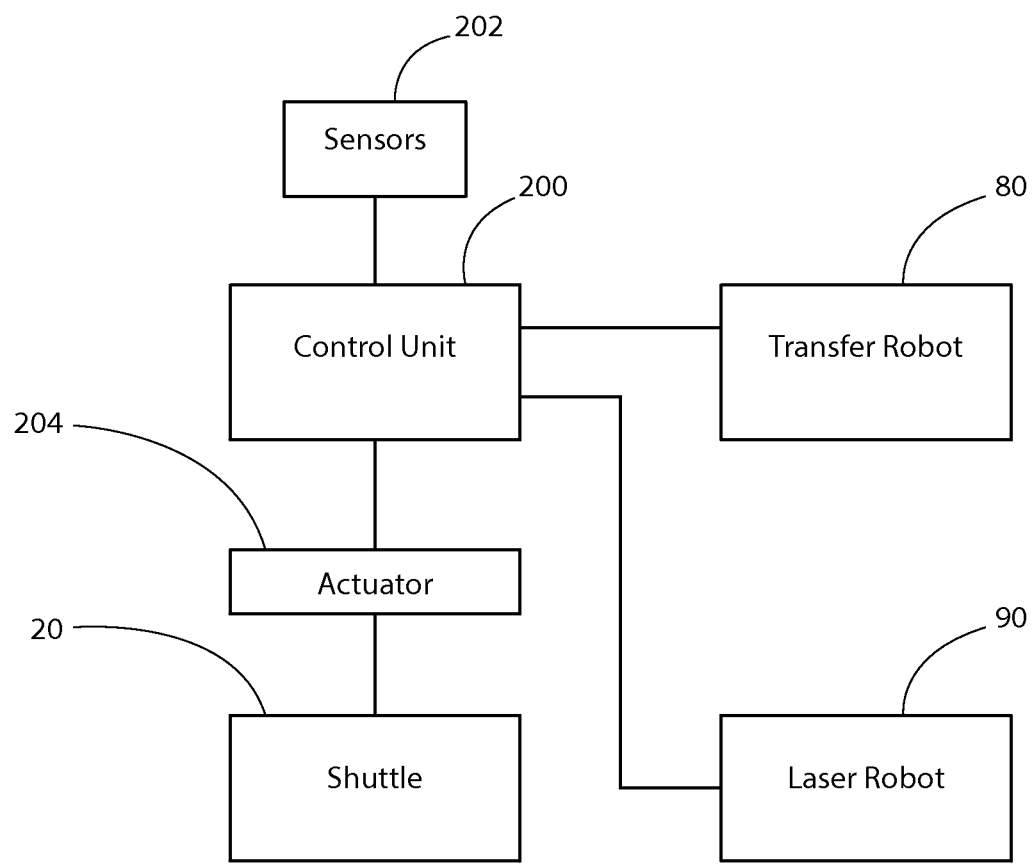
FIG. 6 is a simplified schematic diagram of a control system of the apparatus of FIGS. 1-3.

FIG. 6 illustrates an exemplary control system for the laser processing unit 10. A control unit 200 is operable receive inputs from various sensors 202, to control the transfer robot 80, the laser robot 90, and an actuator 204 for providing motive force to the shuttle 20.

The control unit 200 may be, for example, a microcontroller, an electronic control unit, a laptop, or other type of computer. The sensors 202 may include, for example, position sensors to detect, for example, the location of workspaces, accelerometers for detecting the motion of the shuttle 20, the transfer robot 80 and laser robot 90, current sensors for detecting the current of motors used to actuate the shuttle 20, the transfer robot 80 and laser robot 90, safety switches to detect, for example, that proper laser light-tight seals have been formed between the first and second movable wall sections 60, 70 and first and second stationary wall sections 40, 50, and other sensors for monitoring the performance of the laser processing unit 10.

Each of the transfer robot 80 and laser robot 90 are understood to include actuators, for example motors, and being operable to respond to control signals from the control unit 200.

Operation of First Embodiment

The laser-processing unit 10, as described in a first embodiment, can be understood to cycle between three periods of operation; a workpiece transfer period, a return and preparation period, and a laser operation period. This operation is described below, with reference to FIG. 5.

Workpiece Transfer Period

Figure 5:
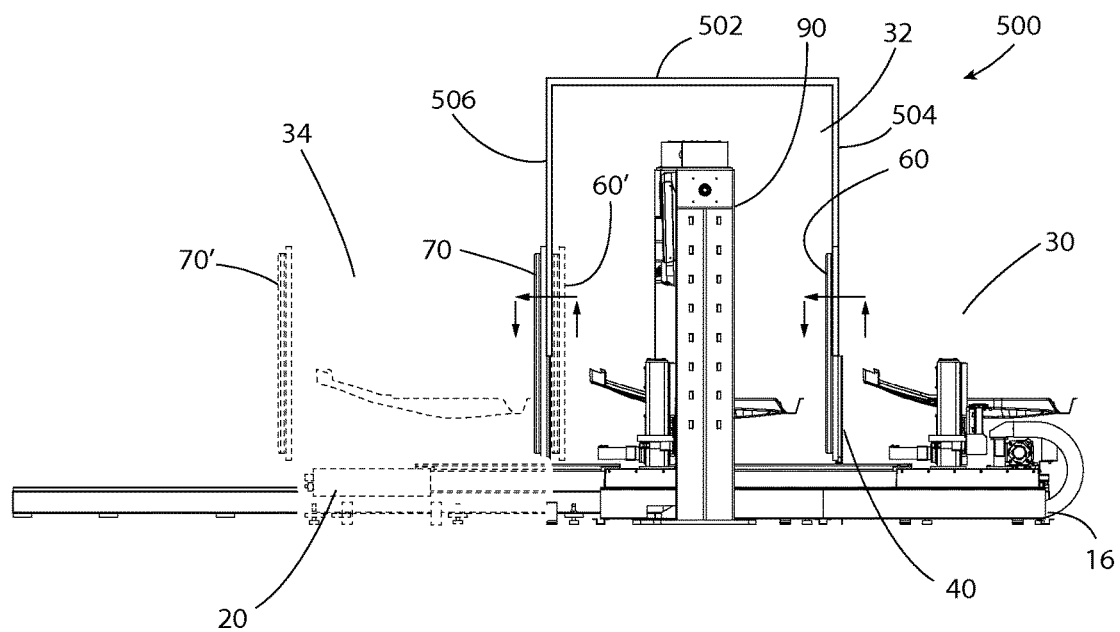
FIG. 5 is a side view of the apparatus of FIGS. 1-2.

FIG. 5 illustrates the workpiece transfer period. During a workpiece transfer period, the fresh, unfinished workpiece is physically moved from the loading station 30 to the workstation 32, and a finished workpiece is simultaneously transferred from the workstation 32 to the unloading station 34.

The solid black arrows on FIG. 5 indicate movement of the workpieces up, over one of the stationary walls and down on the other side during the workpiece transfer period. A transfer robot transfers the fresh, unfinished workpiece from the loading station 30 to the workstation, and simultaneously the finished workpiece is moved by another transfer robot from the workstation 32 to the unloading station 34.

Because at the beginning of the workpiece transfer period (immediately after a laser processing period), the workstation 32 is still sealed against leakage of laser light, it is necessary to provide temporary openings to accommodate moving workpieces into and out of the workstation 32. In the first embodiment, opening the workstation 32 is accomplished by moving the shuttle 20 and attached movable wall sections 60, 70 along the track in a direction towards the track end 18, concurrently with the movement of the workpieces during the workpiece transfer period. This movement of the shuttle 20 and attached movable wall sections 60, 70 along the track temporarily creates a respective C-shaped opening (in the shape of a movable wall section) at each end of the workstation 32, through which the handling arms 82a, 82b. 84a. 84b and the workpieces can pass.

In order to minimize the duration of the workpiece transfer period, the transfer robot 80 transfers the workpieces synchronously and simultaneously with the opening of the workstation 32. As the shuttle 20 moves a distal movable wall section 70 towards the second of distal track end 18, the transfer robot 80 simultaneously moves the finished workpiece out of the workstation 32 and towards the unloading station 34, and the unfinished workpiece is also lifted over the first stationary wall 40 and into the workstation.

The motion of the transfer robot and workpieces is illustrated in FIG. 5. The handling arms 82a. 82b (FIG. 1) of the transfer robot pick up the unfinished workpiece in the loading station 30, lift it up and over the first stationary wall section 40, and place it down in the workstation 32 (e.g., on to a workpiece holding table). Simultaneously, the handling arms 84a, 84b pick up the finished workpiece in the workstation 32, lift it up and over the second stationary wall section 60, and place it down in the unloading station 34.

FIG. 5 also illustrates, in dotted lines, the positions of the first and second movable wall sections 60' and 70', at the furthest extent of their travel in the direction of the distal track end 18. In this position, the first and second movable wall sections 60', 70' have been moved sufficiently to allow the transfer robot 80 to place the workpieces in their respective new locations.

Figure 7:
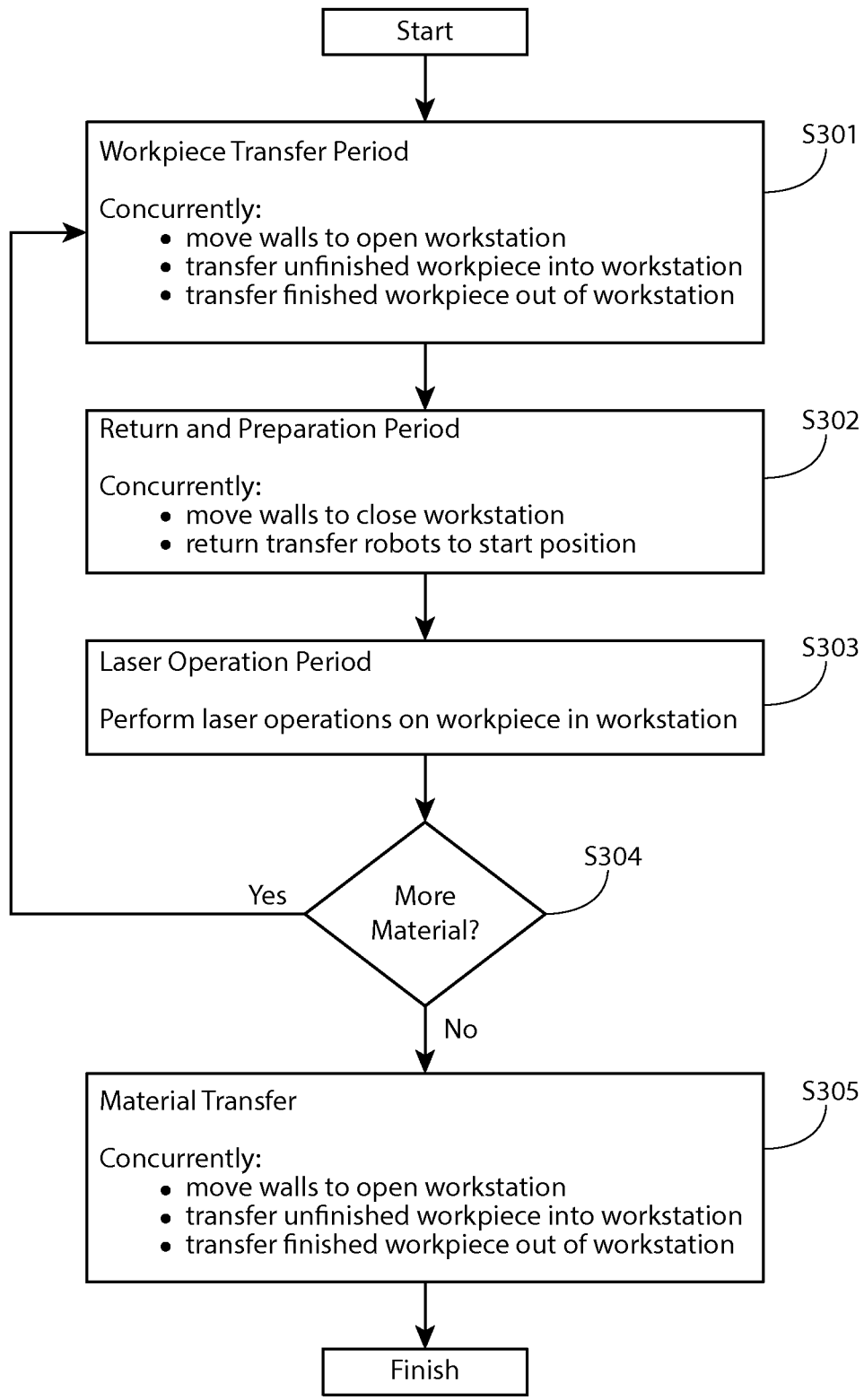
FIG. 7 is a flowchart showing steps in a method according to an embodiment of the invention.

As described above, the workpiece transfer period corresponds to step S301 on the flow chart of FIG. 7.

Return and Preparation Period

After placement of the workpieces in their destination areas as described above, the shuttle is then moved reciprocally in a second direction to move the (now empty) arms 82a. 82b, 84a, 84b of the robot 80 back to their original positions to prepare for another laser operation period. Simultaneously, the shuttle 20 moves the movable wall sections 60, 70 back to their original positions shown in solid lines in FIG. 5. This places the laser processing unit 10 in a condition wherein the workstation 32 is again laser light-tight.

The second stage of the return and preparation phase is that each of the sets of arms then picks up a new workpiece to begin the cycle again, and the laser processing unit 10 can safely perform laser operations on the unfinished workpiece newly placed in the workstation 32. This may occur either in synchronized fashion or in sequence, with the distal set of arms 84a, 84b picking up a workpiece before the proximal set of arms 82a, 82b, which may operate later.

As described above, the Return and Preparation Period corresponds to S302 on the flowchart of FIG. 7.

Laser Operation Period

During the laser operation period, laser cutting and/or welding operations are being performed by the laser robot 90 on a workpiece located in the workstation 32. At the same time, an unfinished workpiece is being placed into the loading station and then loaded into the arms 82a, 82b in the loading station 30.

During the laser operation period, the shuttle 20 is located in a first position near the first end 16 of the tracks. Therefore, the first movable wall section 60 and second movable wall section 70, attached to the shuttle 20, are also in the first position. As described above, the first position describes an arrangement wherein the first movable wall section 60 is abutting the first stationary wall section 40 such that the seal-forming portion 62 of the first movable wall section 60 cooperates with the seal-forming edge portion 42 of the first stationary wall section 40 and the corresponding external end wall (not shown) of the chamber to form a first laser light-tight seal. Similarly, in the first position, the seal-forming edge 72 of the second movable wall section 70 cooperates with the seal-forming edge 52 of the second stationary wall section 50, and the corresponding external end wall (not shown) of the chamber, to form a second laser light-tight seal.

FIG. 5 shows the shuttle 20 in the first position. FIG. 5 also shows the first and second movable wall sections 60, 70 in the first position, drawn in solid lines.

The Laser Operation Period described above corresponds to step 303 of the flowchart of FIG. 7.

As described above, the laser processing unit of the first embodiment has the advantage of reducing the duration of the workpiece transfer period as compared to the prior art. This is because, according to this embodiment, the transfer robot 80 is moving workpieces synchronously with movement of the movable wall sections 60, 70. The workpieces and movable wall sections 60, 70 move synchronously in one direction (from the first end of the tracks towards the second end of the tracks) during the beginning of the workpiece transfer period, and synchronously in the other direction after placement of the workpieces in their new respective locations.

In contrast, according to the conventional method, it is necessary to wait until a sliding door in the workstation is opened before transferring workpieces into the workstation, and wait until the robot arms 82*a*, 82*b*, 84*a* and 84*b* are withdrawn from the workstation and the sliding door is closed before reclosing the workstation.

Second Embodiment

As shown in FIGS. 8A, 8B, 9-11, 12A and 12B, a second laser processing unit 610 includes a pair of tracks, 612, 614, running substantially parallel to each other, and disposed at opposite sides of the laser processing unit 610. The tracks have a first end 616 and a second end 618. A shuttle assembly 620 is movably attached to the tracks and is operable to move selectively and reciprocally along the tracks in either direction between the two ends 616, 618.

As in the first embodiment, the shuttle assembly 620 of the second embodiment has an actuator 204 (FIG. 6) operable to move the shuttle along the tracks.

Figure 11:
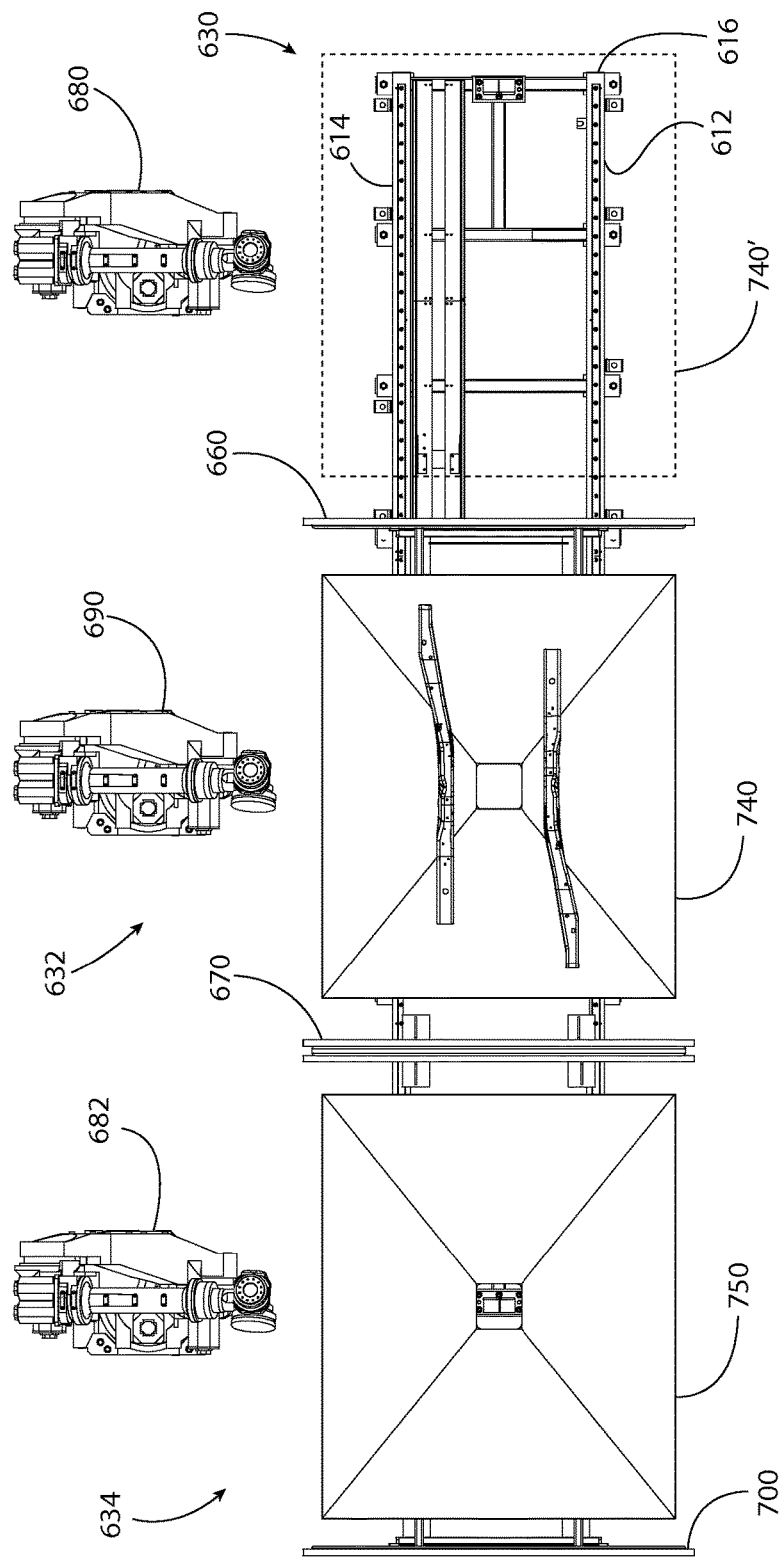
FIG. 11 is a top plan view of the apparatus of FIG. 8-10.

As can best be seen in FIG. 11, a first transfer station 630, a laser workstation 632 and a second transfer station 634 are arranged in fixed positions along the tracks from the first track end 616 to the second track end 618, respectively.

A substantially permanent "brick-and-mortar" or other known permanent type of enclosure 800 (shown in skeletal view in FIGS. 8A and 8B and side view in FIG. 10) surrounds the workstation 632. The enclosure 800 and includes a roof 802, first and second stationary end wall sections 840, 850 and opposed side wall sections 809, 811. The side wall sections can include 808, 810 doors, such as vertical or overhead doors, to provide access to the laser workstation within the enclosure 800.

The first stationary end wall section 840 is disposed between the first transfer station 630, and the workstation 632. The first stationary end wall portion 840 is substantially vertical and extends in a direction perpendicular to the tracks 612, 614 across the tracks 612, 614 and beyond the tracks 612, 614 on each side. In order to allow material to be passed into and out of the laser workstation 632 on a first end, the first stationary end wall section 840 forms a first opening, substantially rectangular in shape, with one side open towards the bottom of the laser processing unit 610, and defined by upper, left and right enclosure edges and a floor or supporting surface on the bottom.

The first stationary end wall section 840 further comprises a sealing portion 842 which extends along the upper, left and right enclosure edges of the first opening. The sealing portion 842 is configured to create a light-tight seal when it comes into close abutting proximity with a corresponding edge portion of either of a first movable wall section 660, or a second movable wall section 670, as will be described in further detail herein.

The second stationary end wall section 850 is disposed between the second transfer station 634, and the workstation 632. The second stationary end wall portion 850 is substantially vertical and extends in a direction perpendicular to the tracks 612, 614 across the tracks and beyond the tracks on each side. In order to allow material to be passed into and out of the laser workstation 632 on a second end, the second stationary end wall section 850 forms a second opening, substantially rectangular in shape, with one side open towards the bottom of the laser processing unit 610, and defined by upper, left and right enclosure edges and a floor or supporting surface on the bottom.

The second stationary end wall section 850 further comprises a sealing portion 852 which extends along the upper, left and right enclosure edges of the second opening. The sealing portion 852 is configured to create a light-tight seal when it comes into close abutting proximity with a corresponding edge portion of either of a second movable wall section 670 or a third movable wall section 700, as will also be described in further detail herein.

The first movable wall section 660 is fixably attached to the shuttle 620 for concurrent movement therewith. The first movable wall section 660 is substantially vertical, rectangular and comprising a sealing portion 662. A shape of the movable wall section 660 is such that the dimensions of an upper edge, left edge and right edge of the first movable wall section 660 correspond with the dimensions of the upper, left and right enclosure edges of the first opening in the first stationary end wall section 840.

Figure 8A:
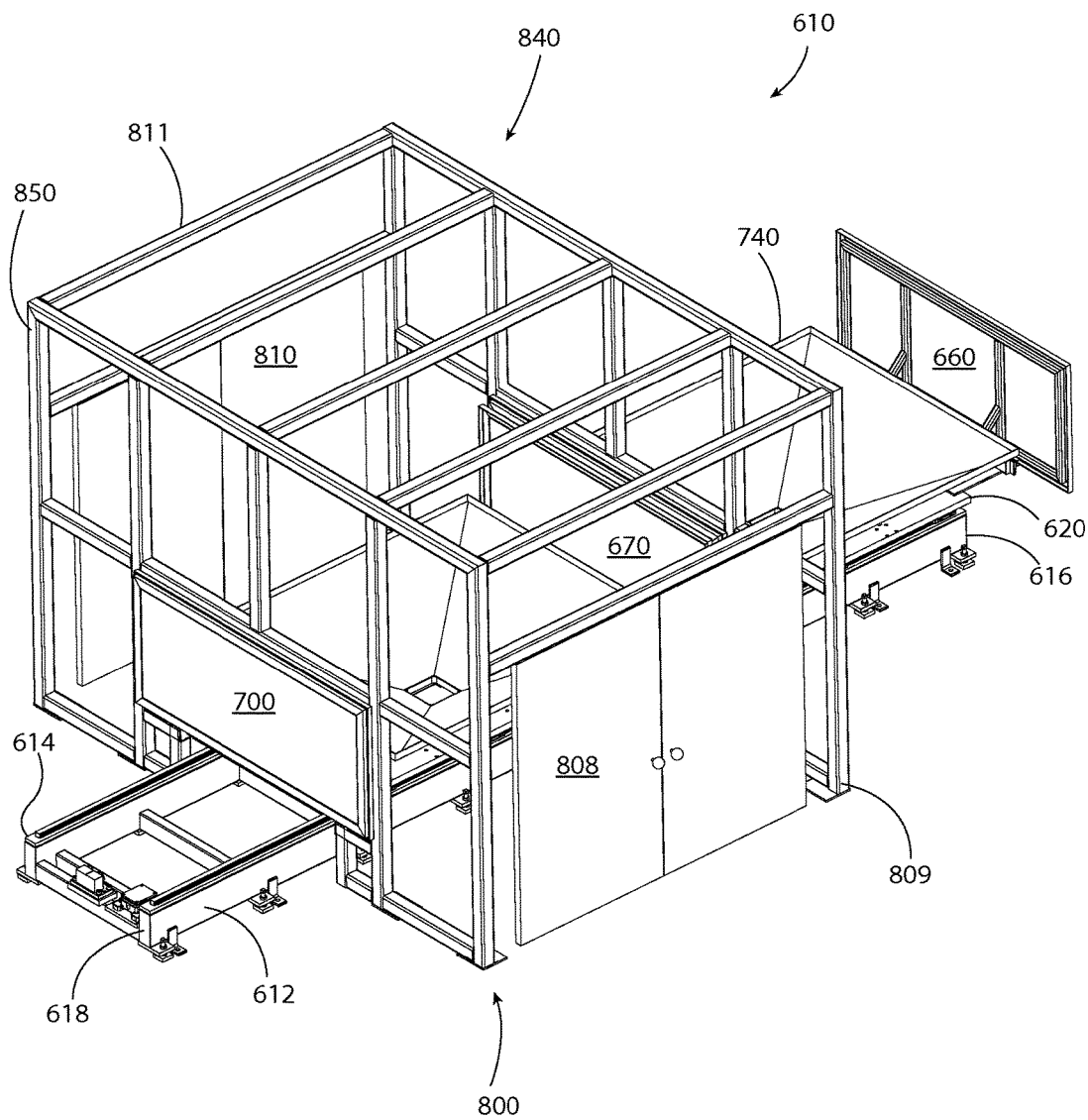
FIGS. 8A and 8B are perspective views of a laser enclosure and workpiece transfer apparatus according to a second embodiment of the invention.
Figure 8B:
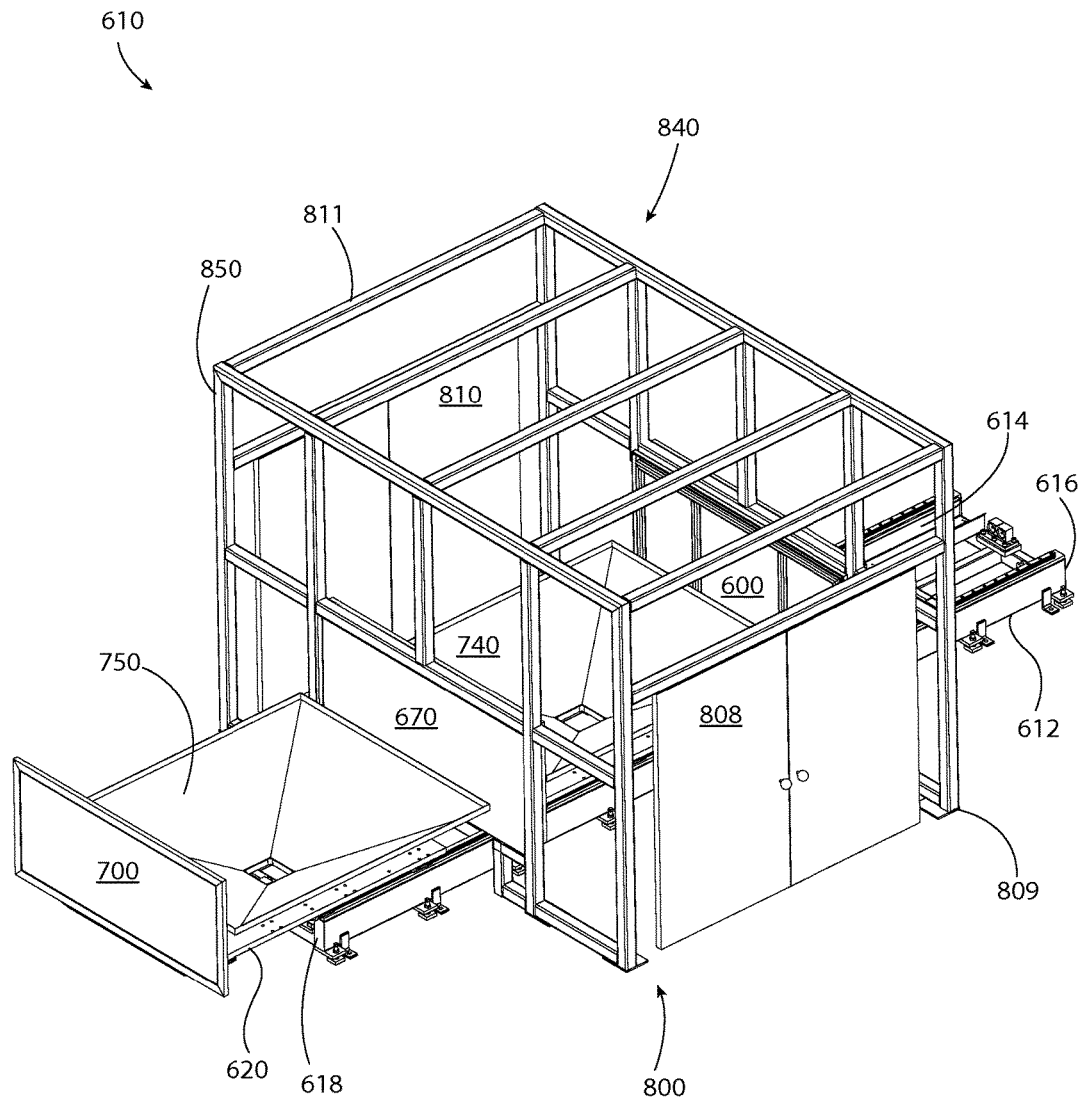
Figure 9:
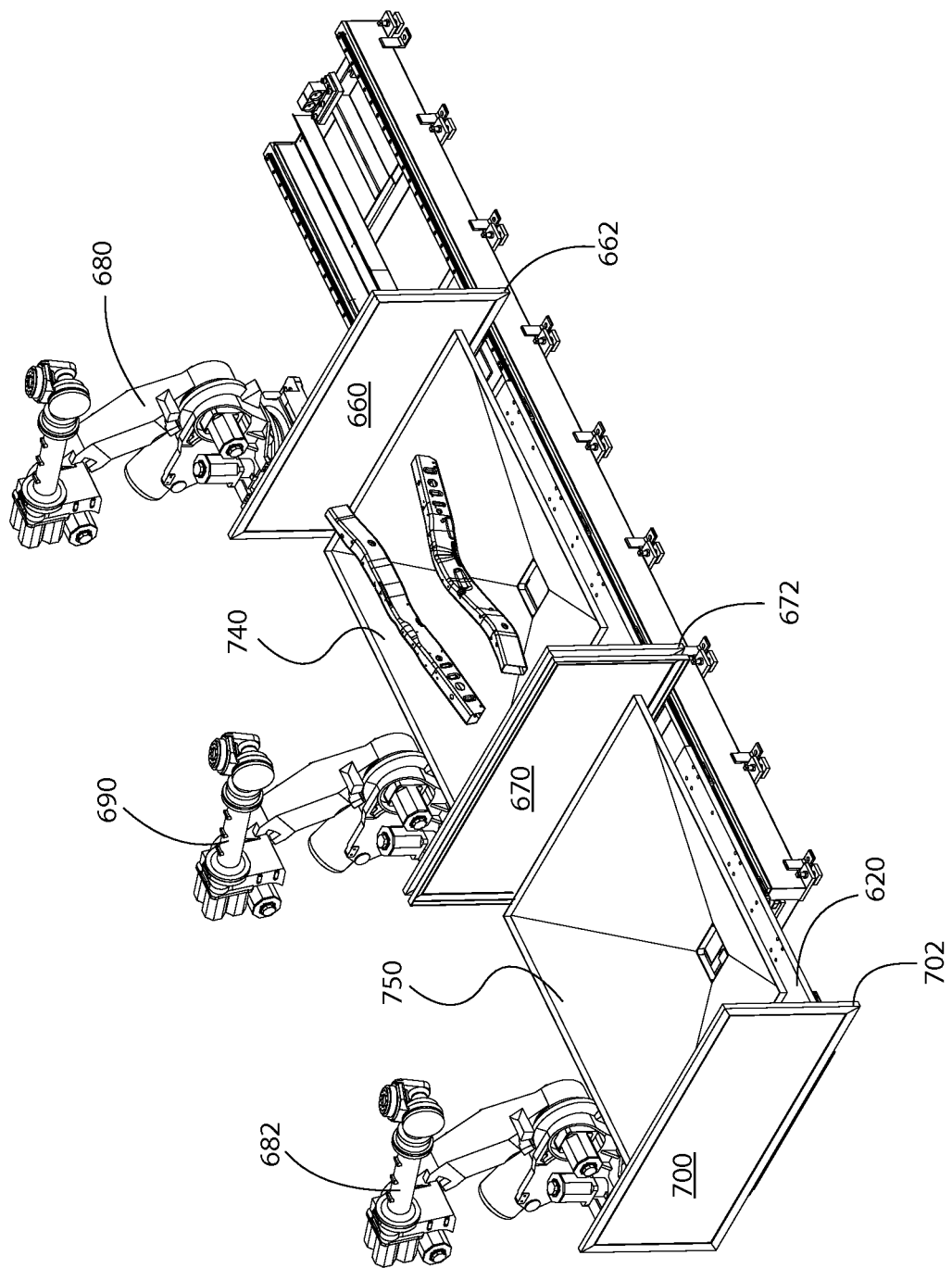
FIG. 9 is a perspective view according to a second embodiment of the invention.
Figure 10:
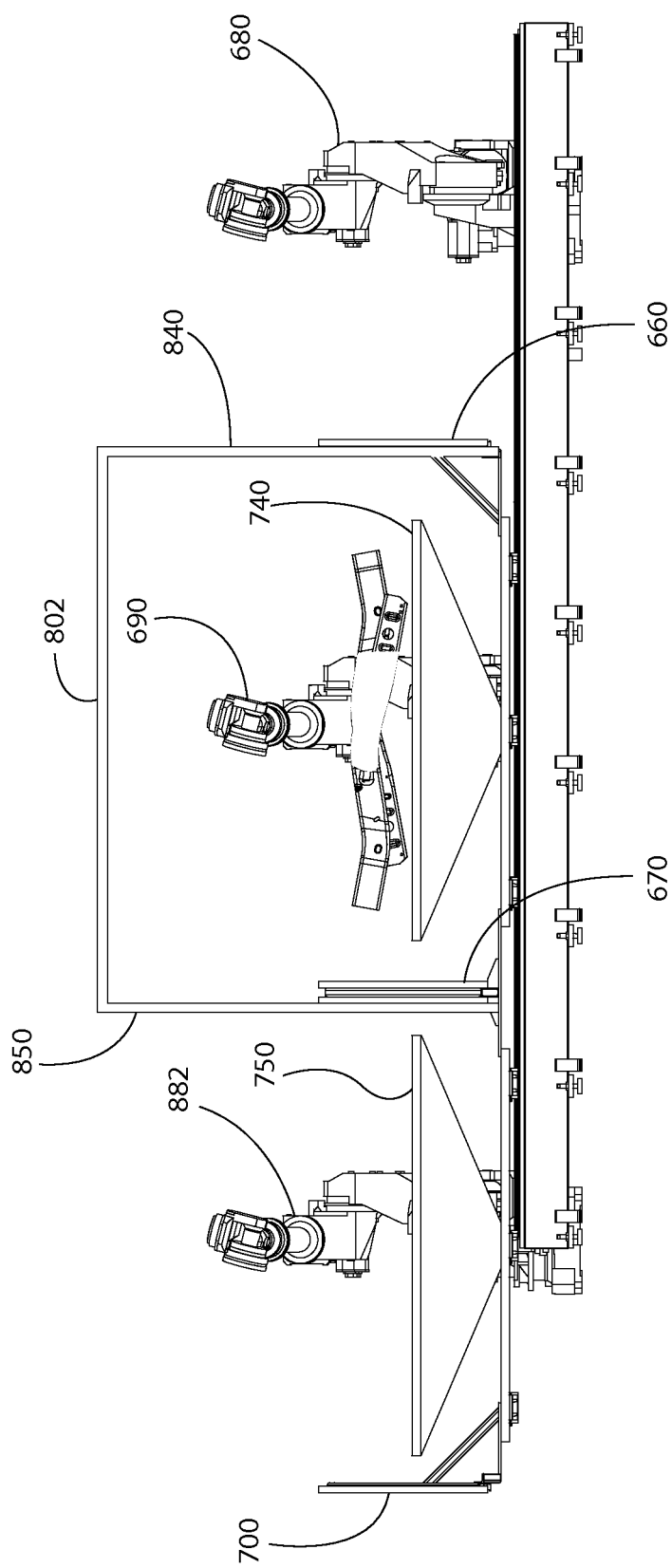
FIG. 10 is a side plan view of the apparatus of FIGS. 8-9.
Figure 12A:
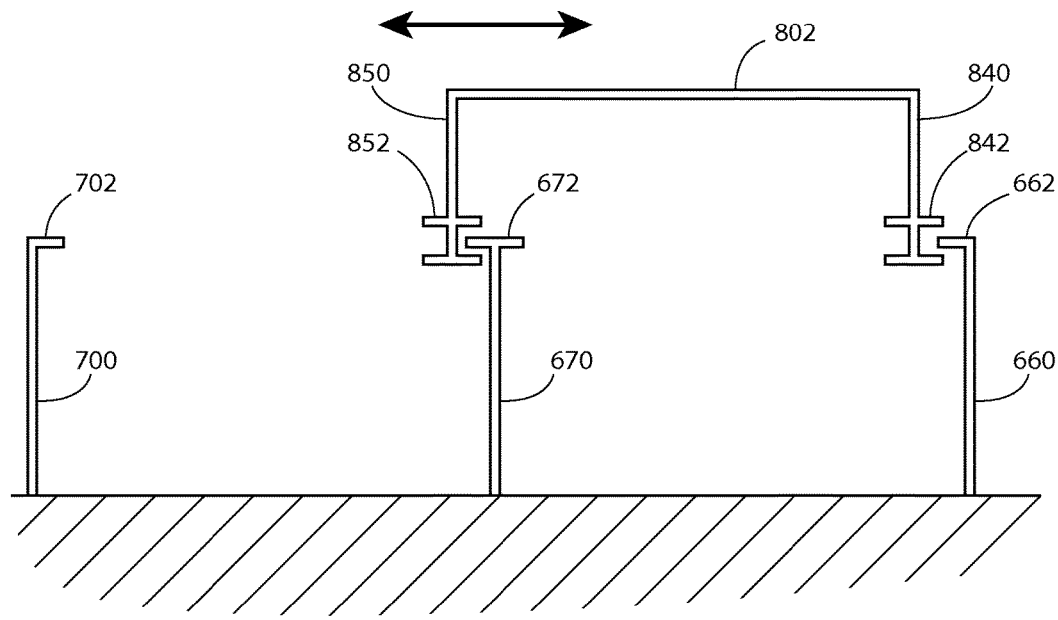
FIGS. 12A and 12B are schematic representations of an exemplary edge sealing system for the second embodiment of the invention.

As shown in FIGS. 8B, 10 and 12A, in a first position, the first movable wall section 660 is disposed proximate the first stationary end wall portion 840, such that a laser light-tight seal is formed between the sealing portion 842 of the first stationary end wall portion 840, and the sealing portion 662 of the first movable wall section 660. In this manner, the first stationary end wall section 840 and the first movable wall section 662 form a first laser-light-tight seal on a first end of the laser processing unit 610.

A second movable wall section 670 is fixably attached to the shuttle 620 for concurrent movement therewith. The second movable wall section 670 is substantially vertical, rectangular and comprising a sealing portion 672. The shape of the second movable wall section 670 is such that the dimensions of a top edge, left edge and right edge of the second movable wall section 670 correspond with the dimensions of the upper, left and right side enclosure edges of the first opening in the first stationary end wall section 840, and also with the upper, left and right side enclosures edges of the second opening in the second stationary end wall section 850.

As shown in FIGS. 8B, 10 and 12A, in the first position, the second movable wall section 670 is disposed proximate the second stationary end wall portion 850, such that a laser light-tight seal is formed between the sealing portion 852 of the second stationary end wall section 850, and the sealing portion 672 of the second movable wall section 670. In this manner, the second stationary end wall section 850 and the second movable wall section 670 form a first laser-light-tight seal on a second end of the laser processing unit 610.

A first tool tray 740 is operable to transfer workpieces into and out of the laser workstation 632. The first tool tray 740 is disposed on the shuttle 620, between the first movable wall section 660, and the second movable wall section 670. The shuttle 620 moves the first tool tray 740 reciprocally between the workstation 632 in the first position, and the first transfer station 630 in a second position.

A third movable wall section 700 is fixably attached to the shuttle 620 for concurrent movement therewith. The third movable wall section 700 is substantially vertical, rectangular and comprising a sealing portion 702. The shape of the third movable wall section 700 is such that die dimensions of a top edge, left edge and right edge of the third movable wall section 700 correspond with the dimensions of the upper, left and right side enclosure edges of the second opening in the second stationary end wall section 850.

As shown in FIGS. 8B, 10 and 12A, in a first position, the third movable wall section 700 is disposed spaced away from the second stationary end wall section 850. In this position, the third movable wall section 700 is near a proximal end of the second transfer station 634, beyond the end 618 of the tracks 612, 614, and opposite the second stationary end wall section 850.

A second tool tray 750 is operable to transfer workpieces into and out of the laser workstation 632. The second tool tray 750 is disposed on the shuttle 620, between the second movable wall section 670, and the third movable wall section 700. The shuttle 620 moves the second tool tray 750 reciprocally between the second transfer station 634 in the first position and the laser workstation 632 in the second position.

The second laser processing unit 610 further includes a first transfer robot 680 operable to transfer workpieces into and out of the first transfer station 630 and a second transfer robot 682 operable to transfer workpieces into and out of the second transfer station 634.

When the shuttle 620 is in the first position, the second tool tray 750 is located in the second transfer station 634. The second transfer robot 682 removes finished workpieces from the second tool tray 750, and then loads unfinished workpieces onto die second tool tray 750.

When the shuttle 620 is in the second position (see FIGS. 8A and 12B), the first tool tray 740 is located in the first transfer station 630. The first transfer robot 680 removes finished workpieces from the first tool tray 740, and then loads unfinished workpieces onto the first tool tray 740.

A laser robot 690 is operable to perform laser operations such as cutting, welding and/or heating on a workpiece while the workpiece is contained in the workstation 632.

Figure 12B:
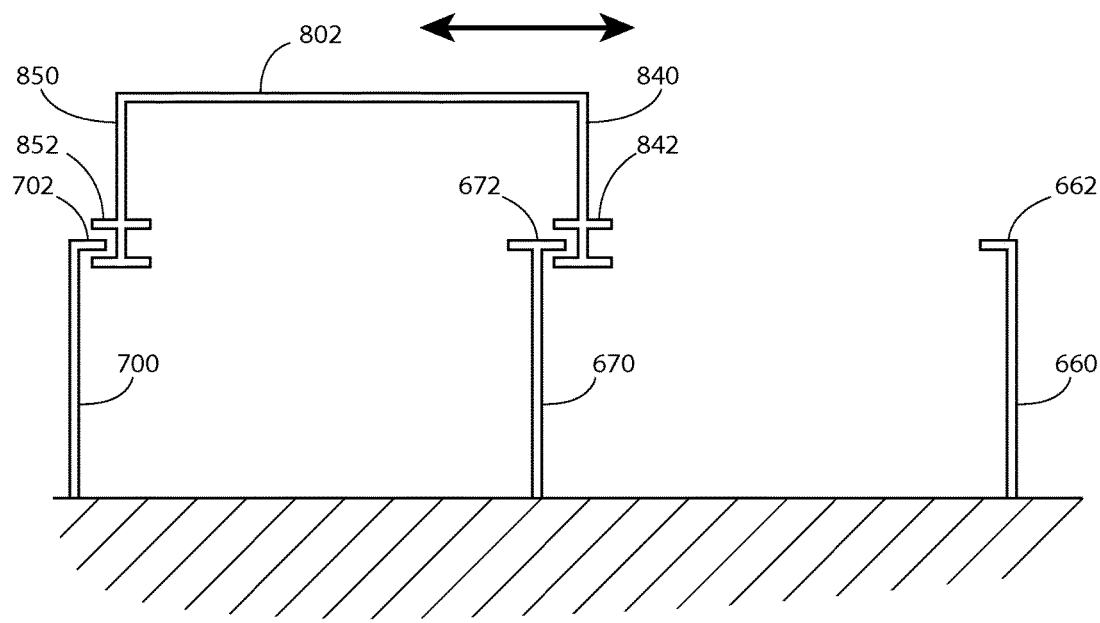

The laser processing unit 610 utilizes a sealing system similar to the system described in the first embodiment. However, as shown in FIGS. 12A and 12B, because the workstation 632 of the laser processing unit 610 must be laser light-tight in each of the first and second positions of the shuttle, the first and second stationary wall sections 840 and 850 have respectively sealing portions 842 and 852 that extend perpendicularly from the first and second stationary wall sections 840, 850 in two directions.

For example, first stationary wall section 840 is provided with sealing edge portion 842. The sealing edge portion 842 has a first outward extending portion extending in the direction of the first movable wall section 660 and a second outward extending portion extending in the direction of the second movable wall section 670. In this manner, the first stationary wall section can form a laser light-tight seal with either of the first or second movable wall sections 660, 670.

Similarly, second stationary wall section 850 is provided with sealing edge portion 852. Sealing edge portion 852 also has first and second outward extending portions for forming a seal with either of the second or third movable wall sections, 670, 700.

Further, in the second embodiment, the second movable wall section 670 forms a laser light-tight seal with the second stationary end wall section 850 when in the shuttle 620 is in the first position, and forms a laser light-tight seal with the first stationary end wall section 840 when the shuttle 620 is in the second position.

Further, as also shown in FIG. 12, in order to form laser light-tight seals with each of the first and second stationary wall sections 640, 650, the second movable wall section 670 is provided with sealing edge portion 672, which has outward extending portions that extend in two directions. In this manner, the second movable wall section 670 can form a laser light-tight seal with either of the first or second stationary end walls 840, 850.

As discussed with regard to the first embodiment, those skilled in the relevant art will understand that many alternate laser light-sealing structures are known and could alternatively be used.

An exemplary control system for the second embodiment is similar to the control system as described for the first embodiment, and shown in FIG. 6, and will not be discussed in detail in regard to the second embodiment.

Operation of Second Embodiment

With reference to FIGS. 8A, 8B, 9-11, 12A, 12B and 13, the laser-processing unit 610, according to the second embodiment can be understood to cycle through four periods of operation; a first workpiece transfer period, a first laser operation period, a second workpiece transfer period and a second laser operation period.

First Workpiece Transfer Period

Figure 13:
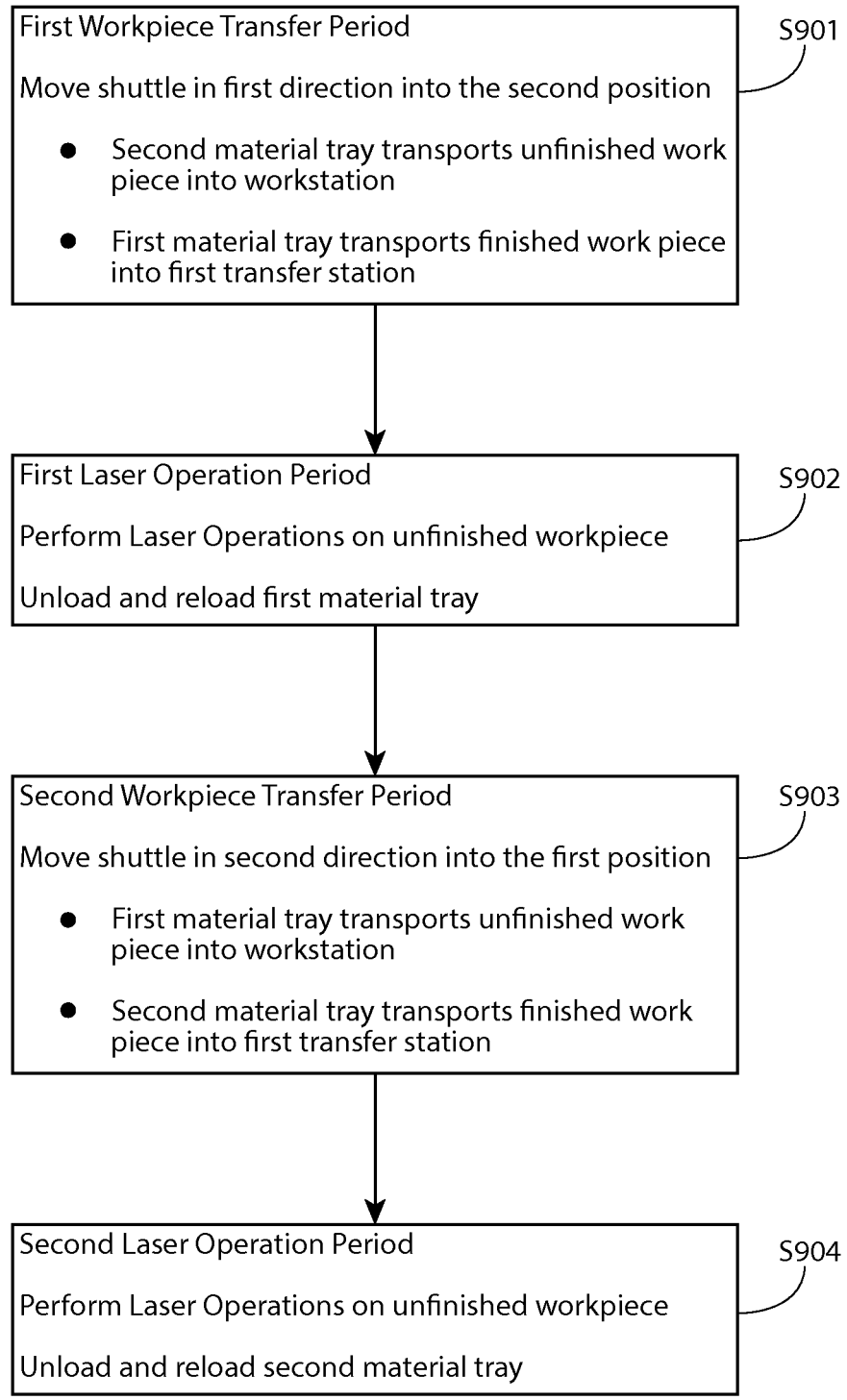
FIG. 13 is a flowchart for an embodiment of the invention.

The first workpiece transfer period is shown as step S901 in the flow chart of FIG. 13.

The shuttle 620 moves from the first position to the second position. The shuttle 620 moves the second tool tray 750 from the second transfer station 634 to the laser workstation 632 and the first tool tray 740 from the laser workstation 632 to the first transfer station 630. The second tool tray 750 transports a fresh, unfinished workpiece from the second transfer station to the laser workstation 632. Simultaneously, the first tool tray 740 transports a finished workpiece to the first transfer station 630.

At the beginning of the first workpiece transfer period, the workstation 632 is sealed against leakage of laser light. The first movable wall section 660 is proximate and forms a seal with the first stationary wall section 840. The second movable wall section 670 is proximate and forms a seal with the second stationary wall section 850. In addition, at the beginning of the first workpiece transfer period, the third movable wall section 700 is on the proximal side of the second transfer station 634, at a location beyond the second track end 618.

In order to transfer material into and out of the workstation 632, it is necessary to open the laser workstation 632. In the second embodiment, the shuttle 620, and attached first, second and third movable wall sections 660, 670, 700 are moved in a first direction towards the track end 616. This movement is concurrent with the movement of the first and second tool trays 740, 750 and the associated workpieces. The movement of the shuttle 620 and attached movable wall sections 660 and 670 along the track temporarily opens respectively the first and second openings at each the first and second ends of the workstation 632, through which the tool trays 740, 750 and associated workpieces can pass.

In the first workpiece transfer period, concurrently with the movement of the workpieces, and the first and second movable wall sections 660, 670, the third movable wall section 700 is moved along the tracks in a direction toward the workstation 632.

At the end of the first workpiece transfer period the shuttle 620 is in the second position. As opposed to the first embodiment, at the end of the first workpiece transfer period, the workstation 632 is again in a closed and in a laser light-tight condition. This is because, with the shuttle 620 in the second shuttle position, the second movable wall section 670 is proximate and forms a seal with the first stationary end wall section 840, and the third movable wall section 700 is proximate with and forms a seal with the second stationary end wall section 850. The first movable wall section 660 is spaced away from the workstation 632, along the tracks 612, 614 and across the first transfer station 630.

FIG. 11 illustrates, in dotted lines, the position of the first tool tray 740' at the end of the first material transfer period.

First Laser Operation Period

The first laser operation period is shown as step S902 in the flow chart of FIG. 13. During the first laser operation period, the laser robot 690 performs laser cutting and/or welding operations on a workpiece located in the workstation 632. At the same time, the transfer robot 680 is removing a finished workpiece from the first tool tray 740 in the first transfer station 630, and then placing a fresh, unfinished workpiece onto the first tool tray 740.

During the first laser operation period, the first, second and third movable wall sections 660, 670, and 700 are in the position as described at the end of the first workpiece transfer period. The second and third movable wall sections 670, 700 close the laser workstation 632. The first movable wall section 660 is spaced away from the workstation 632, along the tracks and across the first transfer station 630.

Second Workpiece Transfer Period

The second workpiece transfer period is shown as step S903 in the flow chart of FIG. 13.

The shuttle 620 moves from the second position to the first position. The shuttle 620 moves the first tool tray 740 from the first transfer station 630 to the laser workstation 632 and the second tool tray 740 from the laser workstation 632 to the second transfer station 634. The first tool tray 740 transports a fresh, unfinished workpiece from the first transfer station 630 to the laser workstation 632. Simultaneously, the second tool tray 750 transports a finished workpiece to the second transfer station 634.

At the beginning of the second workpiece transfer period, the workstation 632 is sealed against leakage of laser light. The second movable wall section 670 is proximate and forms a seal with the first stationary wall section 840. The third movable wall section 700 is proximate and forms a seal with the second stationary wall section 850. In addition, at the beginning of the second workpiece transfer period, the first movable wall section 660 is on the distal side of the first transfer station 630, at a location beyond the first track end 616.

The shuttle 620, and attached first, second and third movable wall sections 660, 670, 700 are moved in a second direction towards the track end 618. This movement is concurrent with the movement of the first and second tool trays 740, 750 and the associated workpieces.

The movement of the shuttle 620 and attached second and third movable wall sections 670 and 700 along the track temporarily opens respectively the first and second openings at each the first and second ends of the workstation 632, through which the tool trays 740, 750 and associated workpieces can pass.

In the second workpiece transfer period, concurrently with the movement of the workpieces, and the second and third movable wall sections 670, 700, the first movable wall section 660 is moved along the tracks in a direction toward the workstation 632.

At the end of the second workpiece transfer period the shuttle 620 is in the first position. The workstation 632 is again in a closed and laser light-tight condition. This is because, with the shuttle 620 in the first shuttle position, the first movable wall section 660 is proximate and forms a seal with the first stationary end wall section 840, and the second movable wall section 670 is proximate with and forms a seal with the second stationary end wall section 850. The third movable wall section 660 is spaced away from the workstation 632, along the tracks 612, 614 and across the second transfer station 634.

Second Laser Operation Period

The second laser operation period is shown as step S904 in the flow chart of FIG. 13. During the second laser operation period, the laser robot 690 performs laser cutting and/or welding operations on a workpiece located in the workstation 632. At the same time, the transfer robot 682 is removing a finished workpiece from the second tool tray 750 in the second transfer station 634, and then placing a fresh, unfinished workpiece onto the second tool tray 750.

During the second laser operation period, the first, second and third movable wall sections 660, 670, and 700 are in the position as described at the end of the second workpiece transfer period. The first and second movable wall sections 660, 670 close the laser workstation 632. The third movable wall section 700 is spaced away from the workstation 632, along the tracks 612, 614 and across the second transfer station 634.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A laser processing unit, comprising:
   a workpiece loading station;
   a laser workstation including a laser robot operable to perform a laser operation on a workpiece;
   a track extending from the workpiece loading station through the laser workstation;
   a first stationary wall section separating the laser workstation from the workpiece loading station at a proximal side of the laser workstation;
   a second stationary wall section offset from the first stationary wall section at a distal side of the laser workstation opposite the proximal side;
   a first movable wall section configured to form a laser light-tight seal with the first stationary wall section;
   a second movable wall section configured to form a laser light-tight seal with the second stationary wall section; and
   a shuttle operable to move along the track to deliver the workpiece from the workpiece loading station to the laser workstation, wherein the first movable wall section and the second movable wall section are supported by the shuttle and move concurrently with the shuttle and the workpiece as the workpiece is delivered to the laser workstation.

2. The laser processing unit of claim 1, further comprising an enclosure surrounding the laser workstation, the enclosure comprising a first end wall section located at the proximal side of the laser workstation and a second end wall section located at the distal side of the laser workstation, wherein:
   the first stationary wall section and the first movable wall section together form at least a portion of the first end wall section of the enclosure surrounding the laser workstation,
   the second stationary wall section and the second movable wall section together form at least a portion of the second end wall section of the enclosure surrounding the laser workstation, and
   during a workpiece transfer operation performed by the laser processing unit, the first movable wall section is moved by the shuttle along the track to form an opening in the first end wall section, and concurrently the workpiece is moved by the shuttle from the workpiece loading station into the laser workstation through the opening in the first end wall section, and the second movable wall section is moved by the shuttle along the track to form an opening in the second end wall section, and concurrently another workpiece is removed by the shuttle from the laser workstation through the opening in the second end wall section.

3. The laser processing unit of claim 2, wherein the track is a first track, the laser processing unit further comprising:
a second track, extending from the workpiece loading station through the laser workstation, upon which the shuttle is operable to move, wherein the first stationary wall section and the second stationary wall section are located between the first track and the second track;
a workpiece unloading station, wherein the workpiece unloading station is separated from the laser workstation by the second stationary wall section; and
a transfer robot supported on the shuttle for carrying the workpiece from the workpiece loading station into the laser workstation during the workpiece transfer operation and concurrently carrying the another workpiece from the laser workstation into the workpiece unloading station during the workpiece transfer operation.

4. The laser processing unit of claim 3, wherein the transfer robot comprises a plurality of handling arms configured to raise the workpiece over the first stationary wall section during the workpiece transfer operation and raise the another workpiece over the second stationary wall section during the workpiece transfer operation.

5. The laser processing unit of claim 1, wherein the workpiece loading station is a first workpiece loading station, the laser processing unit further comprising:
a second workpiece loading station, wherein the second workpiece loading station is separated from the laser workstation by the second stationary wall section,
wherein the second movable wall section is configured for movement across the laser workstation by the shuttle during a workpiece transfer operation performed by the laser processing unit, and to form a laser light-tight seal with the second stationary wall section in a first shuttle position and form the laser light-tight seal with the first stationary wall section in a second shuttle position.

6. The laser processing unit of claim 5, further comprising a third movable wall section supported by the shuttle for concurrent movement with the first movable wall section and the second movable wall section,
wherein the third movable wall section is configured to form a laser light-tight seal with the second stationary wall section in the second shuttle position, and
wherein during the workpiece transfer operation, while the second movable wall section moves across the laser workstation, the first movable wall section moves across the first workpiece loading station and the third movable wall section moves across the second workpiece loading station.

7. The laser processing unit of claim 2, wherein one of the first movable wall section and the second movable wall section moves within the laser workstation during the workpiece transfer operation.

8. The laser processing unit of claim 1, further comprising an enclosure surrounding the laser workstation, the enclosure comprising a first end wall section located at the proximal side of the laser workstation and a second end wall section located at the distal side of the laser workstation, wherein:
the first stationary wall section and the first movable wall section together form at least a portion of the first end wall section of the enclosure surrounding the laser workstation, and the first stationary wall section and the first movable wall section include corresponding seal forming edges that form the laser light-tight seal between the first stationary wall section and the first movable wall section, and
the second stationary wall section and the second movable wall section together form at least a portion of the second end wall section of the enclosure surrounding the laser workstation, and the second stationary wall section and the second movable wall section include corresponding seal forming edges that form the laser light-tight seal between the second stationary wall section and the second movable wall section.

9. A laser processing unit, comprising:
a workpiece loading station;
a workpiece unloading station;
a laser workstation located between the workpiece loading station and the workpiece unloading station, and including a laser robot operable to perform a laser operation on a workpiece;
a track extending from the workpiece loading station through the laser workstation to the workpiece unloading station;
a first stationary wall section separating the laser workstation from the workpiece loading station;
a second stationary wall section offset from the first stationary wall section and separating the laser workstation from the workpiece unloading station;
a first movable wall section configured to form a laser light-tight seal with the first stationary wall section;
a second movable wall section configured to form a laser light-tight seal with the second stationary wall section; and
a shuttle operable to move along the track to deliver the workpiece from the workpiece loading station to the laser workstation, wherein the first movable wall section and the second movable wall section are supported by the shuttle and move concurrently with the shuttle and the workpiece as the workpiece is delivered to the laser workstation.

10. The laser processing unit of claim 9, further comprising an enclosure surrounding the laser workstation, the enclosure comprising a first end wall section separating the laser workstation from the workpiece loading station, and a second end wall section separating the laser workstation from the workpiece unloading station, wherein:
the first stationary wall section and the first movable wall section together form at least a portion of the first end wall section of the enclosure surrounding the laser workstation,
the second stationary wall section and the second movable wall section together form at least a portion of the second end wall section of the enclosure surrounding the laser workstation, and
during a workpiece transfer operation performed by the laser processing unit, the first movable wall section is moved by the shuttle along the track and across the laser workstation to form an opening in the first end wall section, and concurrently the workpiece is moved by the shuttle from the workpiece loading station into the laser workstation through the opening in the first end wall section, and the second movable wall section is moved by the shuttle along the track and across the workpiece unloading station to form an opening in the second end wall section, and concurrently another workpiece is removed by the shuttle from the laser workstation through the opening in the second end wall section.

11. The laser processing unit of claim 10, wherein the track is a first track and the workpiece is a first workpiece, the laser processing unit further comprising:
a second track, extending from the workpiece loading station through the laser workstation, upon which the shuttle is operable to move, wherein the first stationary wall section and the second stationary wall section are located between the first track and the second track; and
a transfer robot supported on the shuttle for carrying the first workpiece from the workpiece loading station into the laser workstation during a workpiece transfer operation performed by the laser processing unit, and concurrently carrying a second workpiece from the laser workstation into the workpiece unloading station during the workpiece transfer operation, wherein
during the workpiece transfer operation, the first movable wall section is moved by the shuttle along the first track and the second track and across the laser workstation to form an opening in the first end wall section, and concurrently the first workpiece is moved by the shuttle from the workpiece loading station into the laser workstation through the opening in the first end wall section, and the second movable wall section is moved by the shuttle along the first track and the second track and across the workpiece unloading station to form an opening in the second end wall section, and concurrently the second workpiece is removed by the shuttle from the laser workstation through the opening in the second end wall section.

12. The laser processing unit of claim 11, wherein the first movable wall section and the second movable wall section are substantially C-shaped, and the opening formed in the first end wall section and the opening formed in the second end wall section are substantially C-shaped.

13. The laser processing unit of claim 11, wherein the transfer robot comprises a first pair of handling arms configured to raise the first workpiece over the first stationary wall section during the workpiece transfer operation, and a second pair of handling arms configured to raise the second workpiece over the second stationary wall section during the workpiece transfer operation.

14. The laser processing unit of claim 13, wherein, during the workpiece transfer operation, the first pair of handling arms are moved by the shuttle through the opening in the first end wall section, and the second pair of handling arms are moved by the shuttle through the opening in the second end wall section.

* * * * *